United States Patent
Tsujimoto

(10) Patent No.: US 8,123,414 B2
(45) Date of Patent: Feb. 28, 2012

(54) TAPERED ROLLER BEARING

(75) Inventor: Takashi Tsujimoto, Shizuoka (JP)

(73) Assignee: NTN Corporation, Osaka (JP)

( * ) Notice: Subject to any disclaimer, the term of this patent is extended or adjusted under 35 U.S.C. 154(b) by 1553 days.

(21) Appl. No.: 11/212,908

(22) Filed: Aug. 29, 2005

(65) Prior Publication Data

US 2006/0045403 A1    Mar. 2, 2006

(30) Foreign Application Priority Data

Sep. 1, 2004  (JP) ................... 2004-254737

(51) Int. Cl.
F16C 33/46   (2006.01)
F16C 33/58   (2006.01)

(52) U.S. Cl. ....................... 384/580; 384/571

(58) Field of Classification Search ............ 384/571, 384/572, 575, 576, 580
See application file for complete search history.

(56) References Cited

U.S. PATENT DOCUMENTS

| | | |
|---|---|---|
| 3,827,771 A | 8/1974 | Fernlund |
| 5,772,338 A | 6/1998 | Hillmann et al. |
| 6,132,102 A | 10/2000 | Bessone et al. |
| 6,547,443 B2 * | 4/2003 | Hanai et al. ................ 384/571 |
| 6,599,019 B2 * | 7/2003 | Matsui et al. .............. 384/450 |
| 2006/0002647 A1 * | 1/2006 | Tsujimoto .................. 384/571 |

FOREIGN PATENT DOCUMENTS

| | | | |
|---|---|---|---|
| EP | 0 897064 A1 | | 2/1999 |
| JP | 50-126841 U | | 10/1975 |
| JP | 03-069823 A | | 3/1991 |
| JP | 11210765 A | * | 8/1999 |
| JP | 2002276672 A | * | 9/2002 |
| JP | 2003028165 A | * | 1/2003 |
| JP | 2005188738 A | * | 7/2005 |

* cited by examiner

Primary Examiner — Thomas R Hannon
(74) Attorney, Agent, or Firm — Arent Fox LLP

(57) ABSTRACT

A tapered roller bearing 1 comprises an inner ring 2, an outer ring 3, a plurality of tapered rollers 4 rollably disposed between the inner and outer rings 2 and 3, and a cage 5 for holding the tapered rollers 4 in predetermined circumferentially spaced relation, wherein the roller coefficient exceeds 0.94, and with the cage 4 positioned at the axial center, there is a clearance between the cage and the raceway surface of the outer ring, and the roller abutting width of the pocket pole surface is secured across 10% or more of the pocket length axially from the central position of the pocket.

6 Claims, 8 Drawing Sheets

At rest
Contacting

[Early period of operation]

Centering of cage
[In operation]

(or reverse)

PRIOR ART

PRIOR ART

TAPERED ROLLER BEARING

BACKGROUND OF THE INVENTION

1. Field of the Invention

This invention relates to a tapered roller bearing used, e.g., in the shaft support section of the transmission of an automobile.

2. Brief Description of the Prior Art

Transmissions (main speed change gears) for automobiles are broadly classified into two types, the manual type and the automatic type. Further, according to the driving systems of vehicles there are front wheel drive (FWD) transaxles, rear wheel drive (RWD) transmissions, and four wheel drive (4WD) transfers (auxiliary speed change gears). These are used to speed-change the driving force from the engine and transmit it to the driving shaft or the like.

FIG. 8 shows an example of construction of a transmission for automobiles. This transmission is of the synchronous meshing type, the left side of the figure being the engine side and the right side the driving wheel side. A tapered roller bearing 43 is interposed between a main shaft 41 and a main drive gear 42. In this example, the inner periphery of the main drive gear 42 is directly formed with the outer ring raceway surface of the tapered roller bearing 43. The main drive gear 42 is supported by a tapered roller bearing 44 for rotation relative to a casing 45. A clutch gear 46 is attached to the main drive gear 42, and a synchro mechanism 47 is disposed adjacent the clutch gear 46.

The synchro mechanism 47 comprises a sleeve 48 adapted to be axially moved by the action of a selector (not shown), a synchronizer key 49 axially slidably mounted on the inner periphery of the sleeve 48, a hub 50 attached to the outer periphery of a main shaft 41, a synchronizer ring 51 slidably mounted on the outer periphery (cone section) of the clutch gear 46, and a presser pin 52 and a spring 53 which elastically press the synchronizer key 49 against the inner periphery of the sleeve 48.

In the state shown in the figure, the sleeve 48 and the synchronizer key 49 are held in the neutral position by the presser pin 52. At this time, the main drive gear 42 is idling relative to the main shaft 41. On the other hand, when the sleeve 48 is moved from the state shown in the figure to, for example, the axially left side by the action of the selector, the synchronizer key 49 is moved to the axially left side while accompanying the sleeve 48, thereby pressing the synchronizer ring 51 against the slope surface of the cone section of the clutch gear 46. Thereby, the rotational speed of the clutch gear 46 is reduced and reversely the rotational speed on the synchro mechanism 47 side is increased. And about the time when their rotational speeds synchronize with each other, the sleeve 48 further moves to the axially left side to mesh with the clutch gear 46, whereupon the main shaft 41 and the main drive gear 42 are connected through the synchro mechanism 47. Thereby, the main shaft 41 and the main drive gear 42 synchronously rotate.

In this connection, in recent years the trend of transmissions for automobiles has been directed to the use of low viscosity oils for purposes including conversion of transmissions into AT or CVT and low fuel consumption. In environments where low viscosity oils are used, if such adverse conditions as (1) high oil temperature, (2) low flow rate of oil, and (3) occurrence of release of preload simultaneously happen, surface originated flaking leading to very short life due to poor lubrication sometimes occurs in the inner ring raceway surface subjected to high surface pressure.

A differential of maximum surface pressure in the raceway surface influences the generation factor of the surface originated flaking. Therefore, reduction of maximum surface pressure is a direct and effective approach to the problem. To reduce the maximum surface pressure, the bearing size must be changed or if such bearing size change is impossible, the filling factor of rollers in the bearing must be increased. To increase the number of rollers without decreasing the roller diameter and to secure pocket spacing of the cage, it is necessary to increase the pitch circle of the cage so as to draw the cage to the outer ring side as much as possible.

As an example in which the cage is drawn until it contacts the inner diameter surface of the outer ring, there is a tapered roller bearing shown in FIG. 9 (see Patent Document 1, Japanese Laid-Open 2003-28165). This tapered roller bearing 61 is adapted to guide a cage 62 while slide-contacting the outer peripheral surfaces of the small and large diameter side annular sections 62a and 62b of the cage 62 with the inner diameter surface of the outer ring 63, and has a recess 64 formed in the outer diameter surface of the pole section 62c of the cage 62 for suppressing the drag torque, thereby maintaining the non-contact state between the outer diameter surface of the pole section 62c and the raceway surface 63a of the outer ring 63. The cage 62 comprises the small diameter side annular section 62a, the large diameter side annular section 62b, and the plurality of pole sections 62c axially connecting the small and large diameter side sections 62a and 62b and having the recess 64 formed in the outer diameter surfaces thereof. And, there are provided a plurality of pockets for rollably receiving tapered rollers 65 between adjacent pole sections. The small diameter side annular section 62a is provided with an integrally extending flange 62d on the inner diameter side. As compared with the conventional type in which the cage and the outer ring do not contact each other, the tapered roller bearing of FIG. 9 is capable of increasing the roller filling factor, thus making it possible to prevent early breakage due to excessive surface pressure on the raceway surface.

SUMMARY OF THE INVENTION

As compared with the type in which the cage and the outer ring do not contact each other, the tapered roller bearing 61 described in Patent Document 1 is capable of increasing the roller filling factor and reducing the maximum surface pressure on the raceway surface. However, non-contact between the cage and the central portion of the raceway surface results in the demerit that the plate thickness in that portion is thin. That is, the presence of the recess 64 in the pole section 62c of the cage 62 inevitably decreases the plate thickness, incurring the possibilities of lowering the rigidity of the cage 62, deforming the cage 62 due to stresses during assembly of the bearing 61, causing the cage 62 to deform during rotation of the bearing 61 and so on. An attempt to increase the rigidity of the cage 62 increases the diameter of the cage 62, leading to the possibility of producing a torque increase or the so-called drag torque due to slide contact in the outer ring contact section.

On the other hand, in other typical conventional cage-equipped tapered roller bearings than the tapered roller bearing described in Patent Document 1, in order to secure the pole width of the cage 72 and obtain proper pole strength and smooth rotation of the cage 72 after avoiding contact between the outer ring 71 and the cage 72 as shown in FIG. 10, the roller coefficient (roller filling factor) γ defied by the following formula must be normally 0.94 or less (see Patent Document 2, Japanese Patent Laid-Open Hei 11-210765).

Roller coefficienty $\gamma=(Z \cdot DA)/(\pi \cdot PCD)$, where Z is the number of rollers, DA is the average diameter of rollers, and PCD is the pith circle diameter. In addition, in FIG. 10, the reference character 73 denotes a tapered roller, 74 denotes a pole surface, 75 denotes an inner ring, and θ denotes a window angle.

When an attempt is made to simply increase the filling factor while retaining the pocket size of the cage 72, the pole 72a of the cage 72 becomes so thin that sufficient pole strength cannot be secured. On the other hand, if the diameter of the cage is changed in the direction to decrease the clearance between the cage and the outer ring (to increase the diameter), there is a danger of accelerating wear in the outer ring contact region of the cage, causing an increase in drag torque, as introduced by Patent Document 1.

An object of the invention is to provide a tapered roller bearing which is capable of increasing the number of rollers to be received without lowering the cage rigidity and which does not produce drag torque.

The invention provides a tapered roller bearing comprising an inner ring, and outer ring, and a plurality of tapered rollers rollably interposed between the inner and outer rings, wherein the roller coefficient γ exceeds 0.94 and in that the roller abutting width of the pocket pole surface is 10% or more of the pocket length with respect to the axial central position of the pocket on both the right and left sides. Further, the roller abutting width of the pocket pole surface is 10% or more of the pocket length with respect to the axial central position of the pocket on both the right and left sides, thereby preventing the occurrence of abnormal wear due to the load which acts from the roller to the cage being locally concentrated or being offset or the occurrence of damage due to stress concentration. This allows the roller coefficient γ to be such that $\gamma>0.94$.

With the cage positioned at the axial center, there may be a clearance between the outer diameter of the cage and the outer ring raceway surface. Determining the size of the cage such that there is a clearance ensures that contact between the outer ring and the cage hardly occurs during operation of the bearing.

The cage may be made of steel plate. The cage of steel plate has the merit that it can be used without caring about oil resistance (qualitative deterioration due to immersion in oil).

The cage may be made of resin, i.e., engineering plastic. Since the resin-made cage makes unnecessary such operations as bottom widening and crimping during assembly of the bearing, it is easy to secure the required dimensional accuracy. Further, as compared with the steel-plastic-made cage, the resin-made cage is characterized in that it is light in weight and has self-lubricability and low friction coefficient, a fact which, coupled with the effect of the lubricating oil present in the bearing, makes it possible to suppress the occurrence of wear due to contact with the outer ring. Further, since the resin-made cage is light in weight and small in friction coefficient, it is suited for reduction of torque loss and cage wear at the start of the bearing.

Engineering plastics include general purpose engineering plastics and super engineering plastics. Typical examples are given below, but these are examples of engineering plastics given in a non-limiting sense.

[General purpose engineering plastics] polycarbonate (PC), polyamide 6 (PA6), polyamide 66 (PA66), polyacetal (POM), modified polyphenylene ether (m-PPE), polybutylene terephthalate (PBT), GF reinforced polyethylene terephthalate (GF-PET), ultra high molecular weight polyethylene (UHMW-PE).

[Super engineering plastics] polysulfone (PSF), polyethersulfone (PES), polyphenylenesulfide (PPS), polarylate (PAR), polyamideimide (PAI), polyetherimide (PEI), polyetheretherketone (PEEK), liquid crystal polymer (LCP), thermoplastic polyimide (TPI), polybenzimidasol (PBI), polymethylpentene (TPX), poly 1,4-cyclohexanedimethyllene terephthalate (PCT), polyamide 46 (PA46), polyamide 6T (PA6T), polyamide 9T (PA9T), polyamide 11, 12 (PA11, 12), fluorine resin, polyphthalamide (PPA).

According to the invention, it becomes possible to set the roller coefficient γ of the tapered roller bearing such that γ>0.94, thereby lowering the maximum surface pressure on the raceway surface. Therefore, it is possible to prevent surface-originated flaking leading to very short life under severe lubrication conditions. Further, since drag torque due to contact of the cage is not produced, the wear in the cage pockets can be minimized.

Table 1 shows life test results under severe lubrication and overload conditions. The comparative example 2 is the same as the embodiment except that the former uses a cage made of steel plate and allows contact between the outer ring and the cage.

TABLE 1

|  | Roller coefficient | Lifetime h | Remarks |
|---|---|---|---|
| Comparative example 1 | 0.86 | 16.4 | Inner ring flaked |
| Comparative example 2 | 0.96 | 40.2 | Stopped due to torque increase caused by cage wear |
| Embodiment | 0.96 | 200 or above | No abnormality, cut off |

As is clear from the test results shown in Table 1, the comparative example 1 caused inner ring flaking, the lifetime being 16.4 h. In the comparative example 2, because of a torque increase due to cage wear, the test stopped at a lifetime of 40.2 h. In the embodiment, no abnormality whatsoever was recognized after 200 h. In addition, the calculated life based on JIS under the same test conditions is 92.2 h.

These and other objects and features of the invention will become more apparent from the following description when read in conjunction with the accompanying drawings.

DESCRIPTION OF THE PREFERRED EMBODIMENTS

Figure 1A:
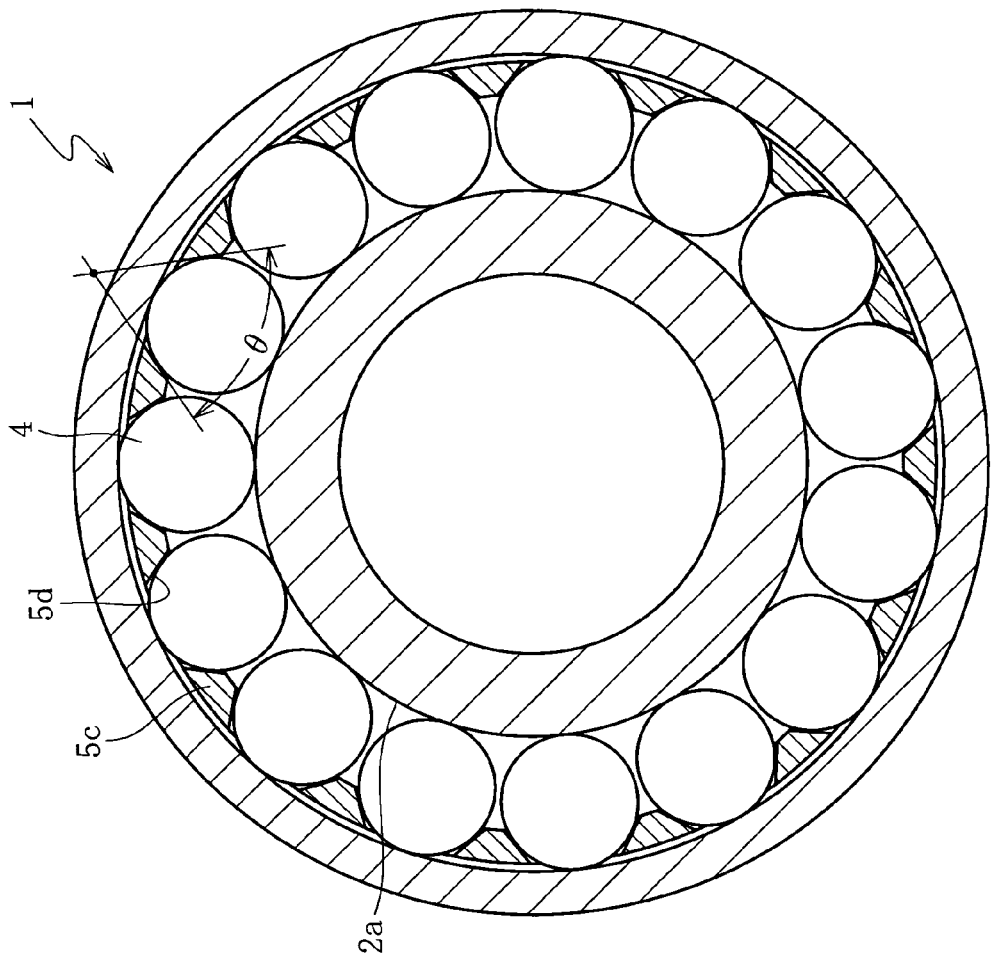
FIG. 1A is a cross-sectional view of a tapered roller bearing.
Figure 1B:
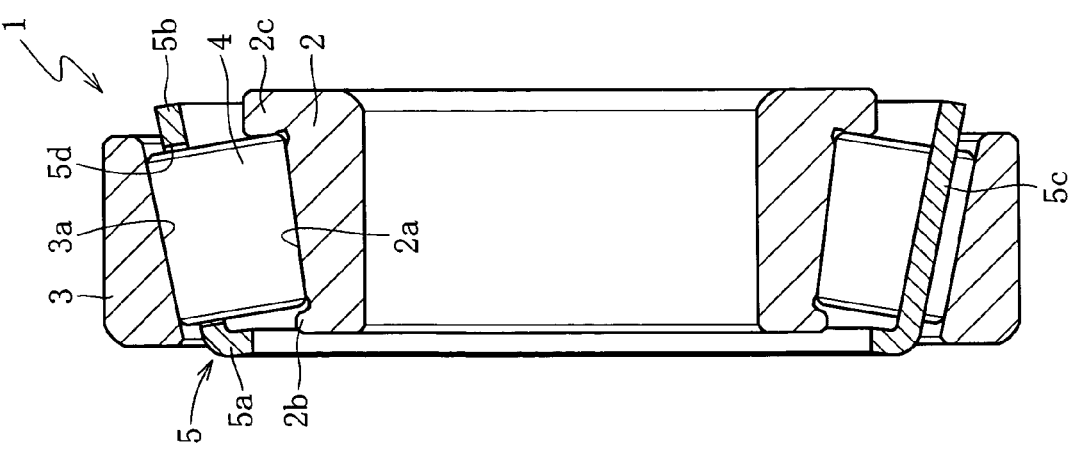
FIG. 1B is a longitudinal sectional view.

As shown in FIGS. 1A and 1B, a tapered roller bearing 1 in this embodiment comprises an inner ring 2 having a tapered raceway surface 2a which has a small flange 2b on the small diameter side and a large flange 2c on the large diameter side, an outer ring 3 having a tapered raceway surface 3a, a plurality of tapered rollers 4 rollably disposed between the raceway surface 2a of the inner ring 2 and the raceway surface 3a of the outer ring 3, and a cage 5 holding the tapered rollers 4 in circumferentially equispaced relation.

The cage 5, which is made of steel plate in this case, can be used without caring about qualitative deterioration due to immersion in oil (oil resistance). Instead of being made of steel plate, the cage 5 may be integrally molded for example of super engineering plastic, such as PPS, PEEK, PA, PPA or PAI. The cage 5 is provided with an annular section 5a on the small diameter side, an annular section 5b on the large diameter side, and a plurality of pole sections 5c for axially connecting the annular sections 5a and 5b on the small and large diameter sides, respectively. The window angle θ is 25-50, for example.

Figure 2A:
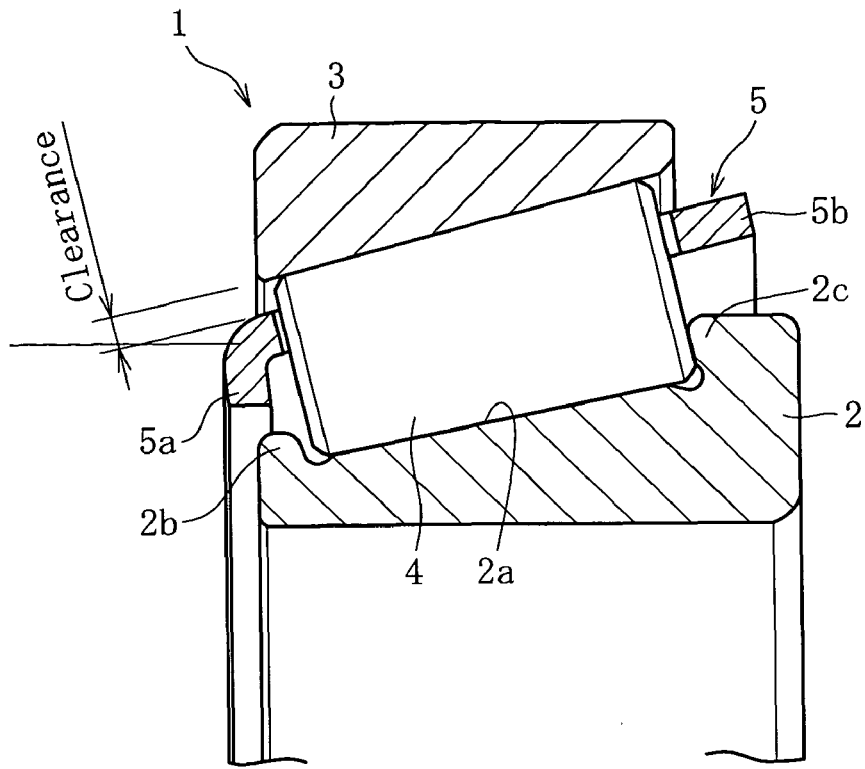
FIG. 2A is a longitudinal sectional view of the tapered roller bearing before the cage is axially moved.
Figure 2B:
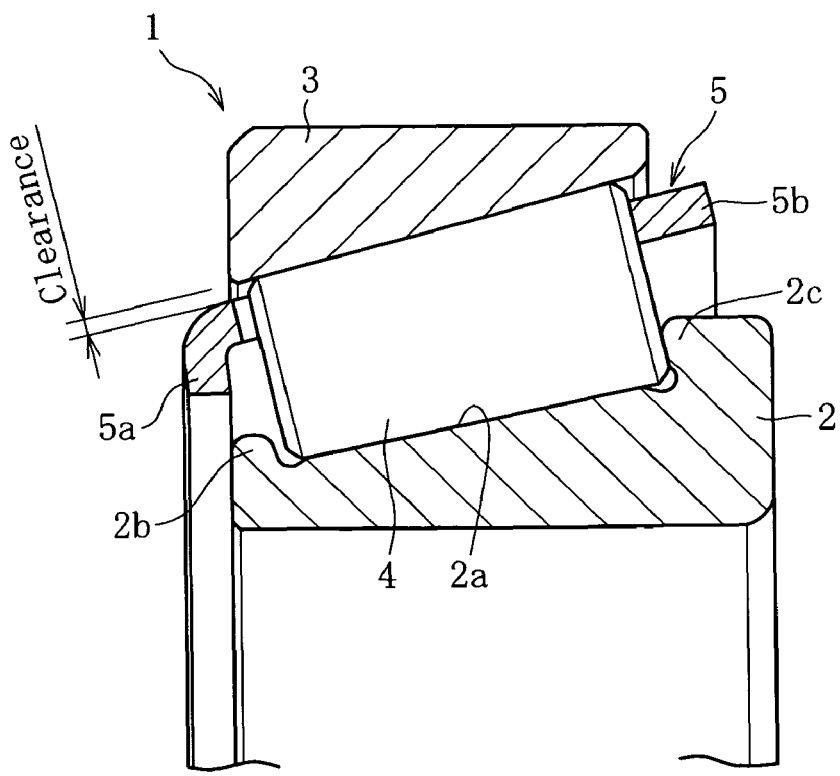
FIG. 2B is a longitudinal sectional view of the tapered roller bearing after the cage has been moved.
Figure 3A:
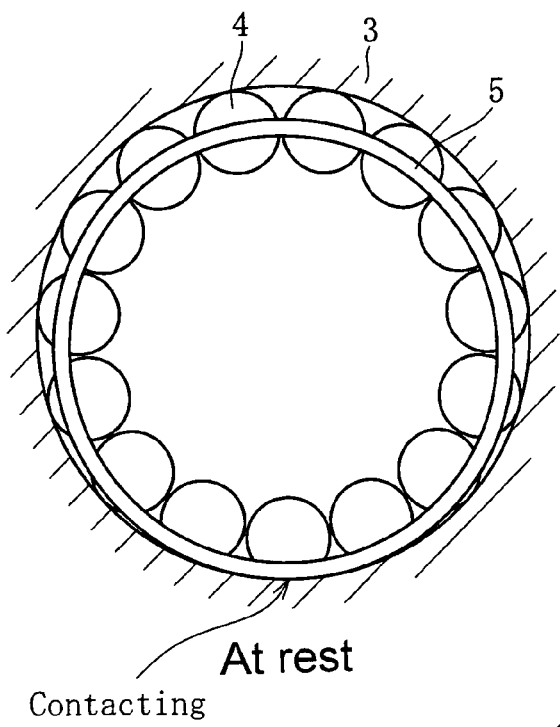
FIG. 3A is a cross sectional view of the tapered roller bearing at rest.
Figure 3B:
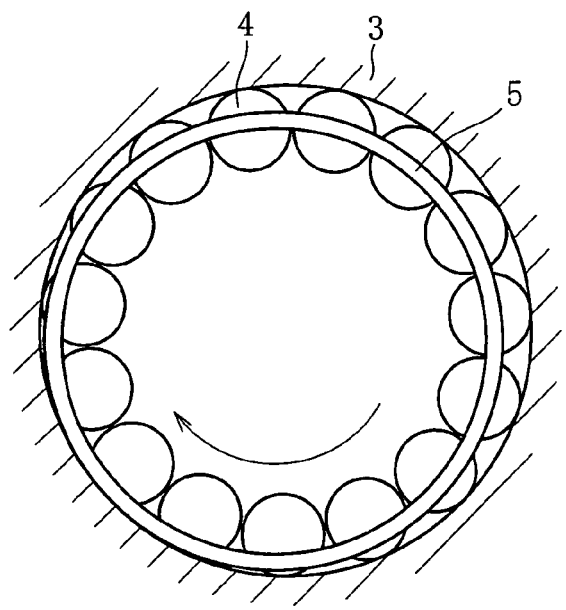
FIG. 3B is a cross sectional view of the tapered roller bearing in an early period of rotation.
Figure 3C:
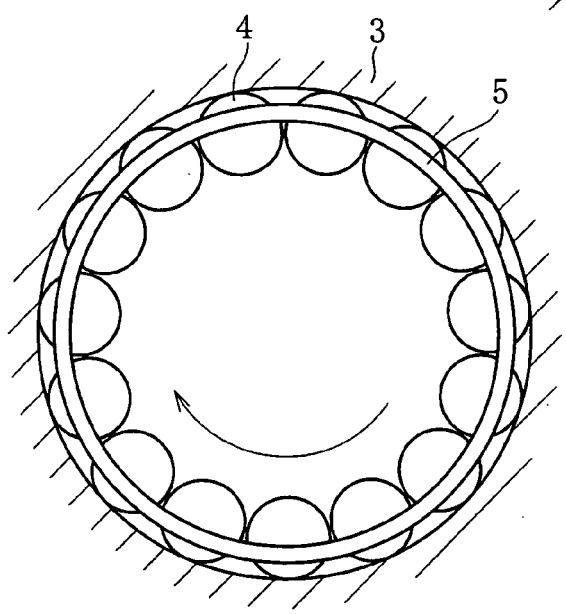
FIG. 3C is a cross sectional view of the tapered roller bearing in rotation.
Figure 4:
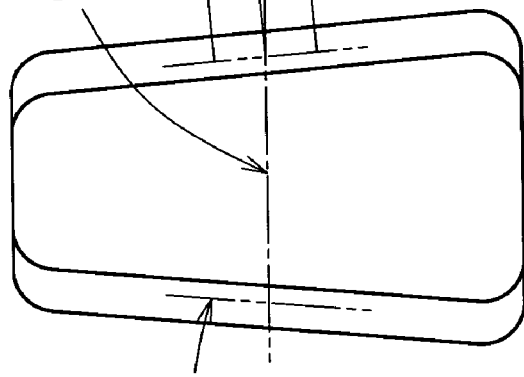
FIG. 4 is a schematic view of a cage pockets.

The outer diameter of the cage 5 is set at a dimension such that when the cage 5 is moved from the state of FIG. 2A to the axial small diameter side as shown by the arrow in the same figure (FIG. 2B) and then to the radially lower side as shown in FIG. 3C, the outer ring 3 and the cage 5 contact each other and when the bearing is rotated to cause the centering of the cage 5 as shown in FIG. 3C, a non-contact state is established between the cage 5 and the outer ring 3 with a predetermined clearance defined therebetween throughout the circumference. In other words, such dimension is a dimension such that with the cage 5 disposed at the axial center and nearer to the small diameter side as shown in FIG. 2B, there is produced a clearance between the cage 5 and the outer ring 3, while when the cage 5 is radially moved from the axial center, the outer ring 3 and the cage 5 contact each other. Thereby, the outer ring 3 and the cage 5 contact each other in an early period of operation (FIG. 3B), but during operation (FIG. 3C), they do not contact, making it possible to suppress drag torque increase and wear due to contact.

In addition, in the case of a cage made of steel plate, bottom enlarging and crimping are required, but in the case of a cage made of resin, such operations are not required, so that it is easy to secure the necessary dimensional accuracy. Here, "bottom enlarging" refers to greatly enlarging the diameter of the pole sections of the cage on the small diameter side to allow the rollers to roll over the small flange of the inner ring when the cage having the rollers incorporated therein is assembled to the inner ring. And "crimping" refers to pushing, from outside, the pole sections of the cage 5 on the small diameter side greatly enlarged as described above, by a form to restore the same.

Figure 5:
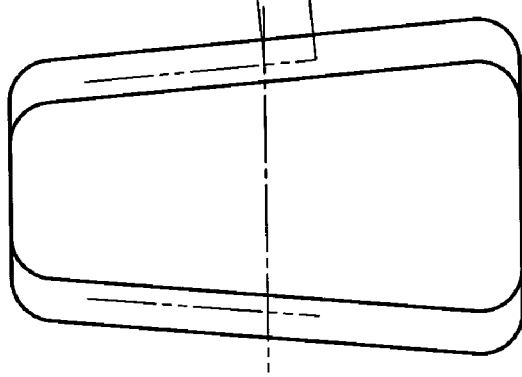
FIG. 5 is a schematic view of a cage pockets.
Figure 6:
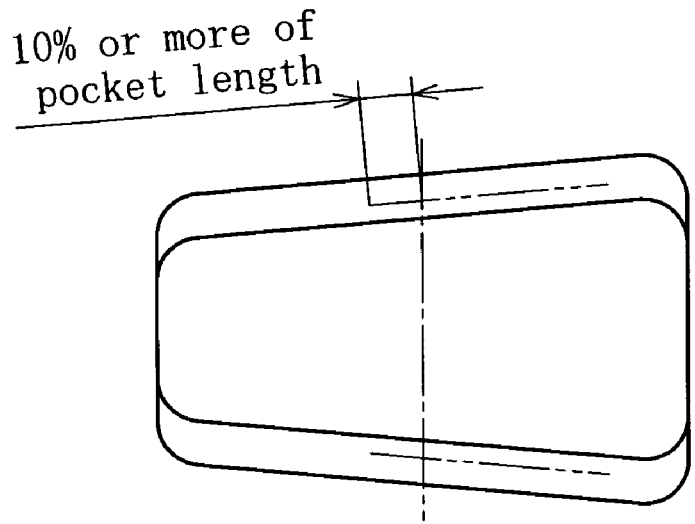
FIG. 6 is a schematic view of a cage pockets.
Figure 7:
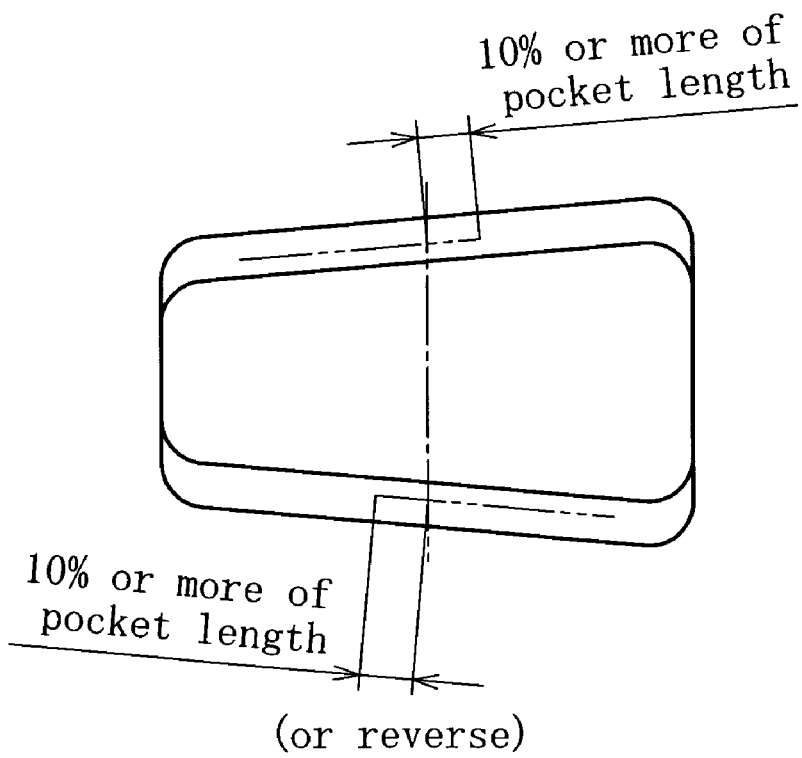
FIG. 7 is a schematic view of a cage pockets.
Figure 8:
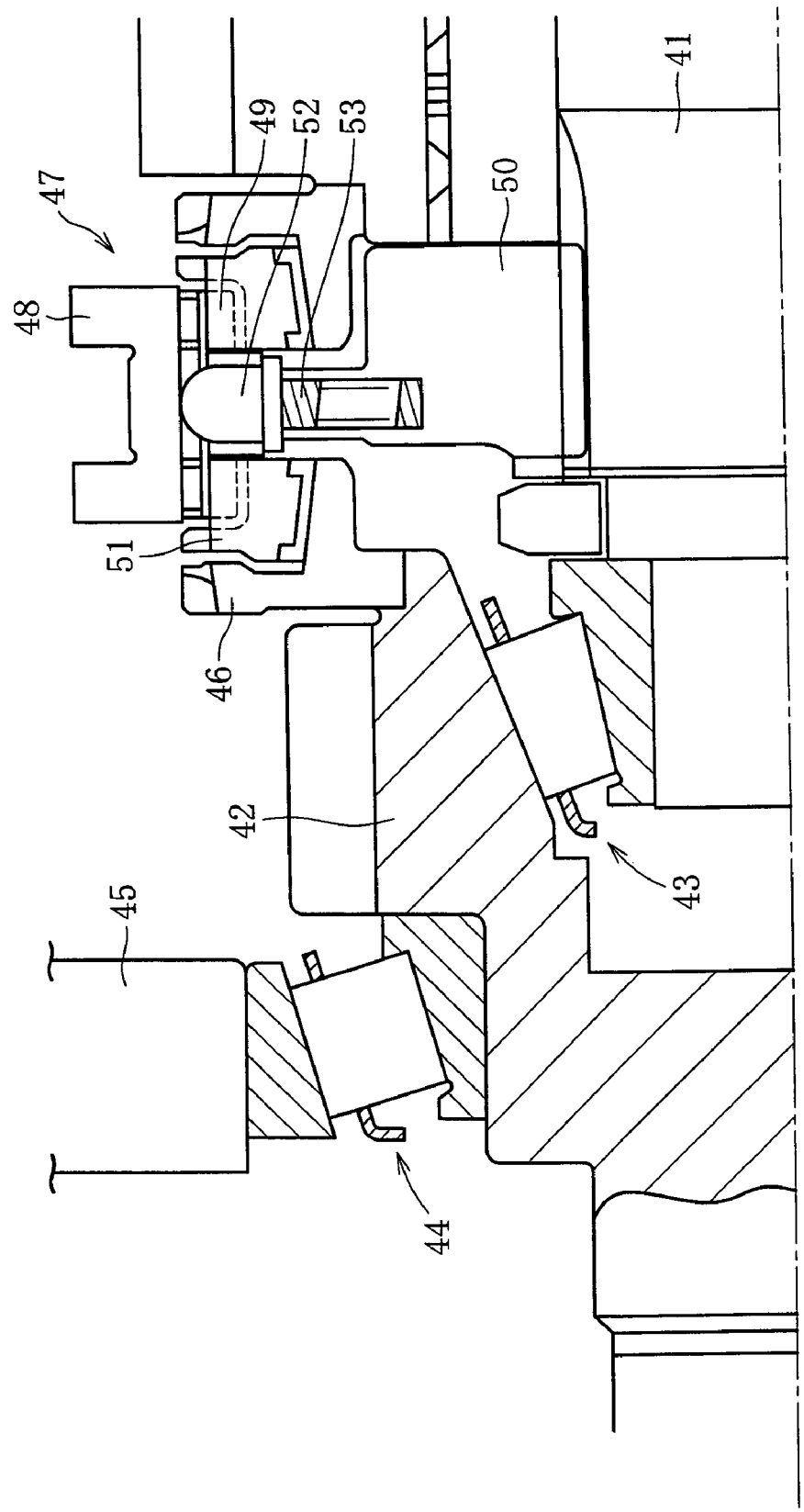
FIG. 8 is a principal longitudinal sectional view of a transmission for automobiles.
Figure 9:
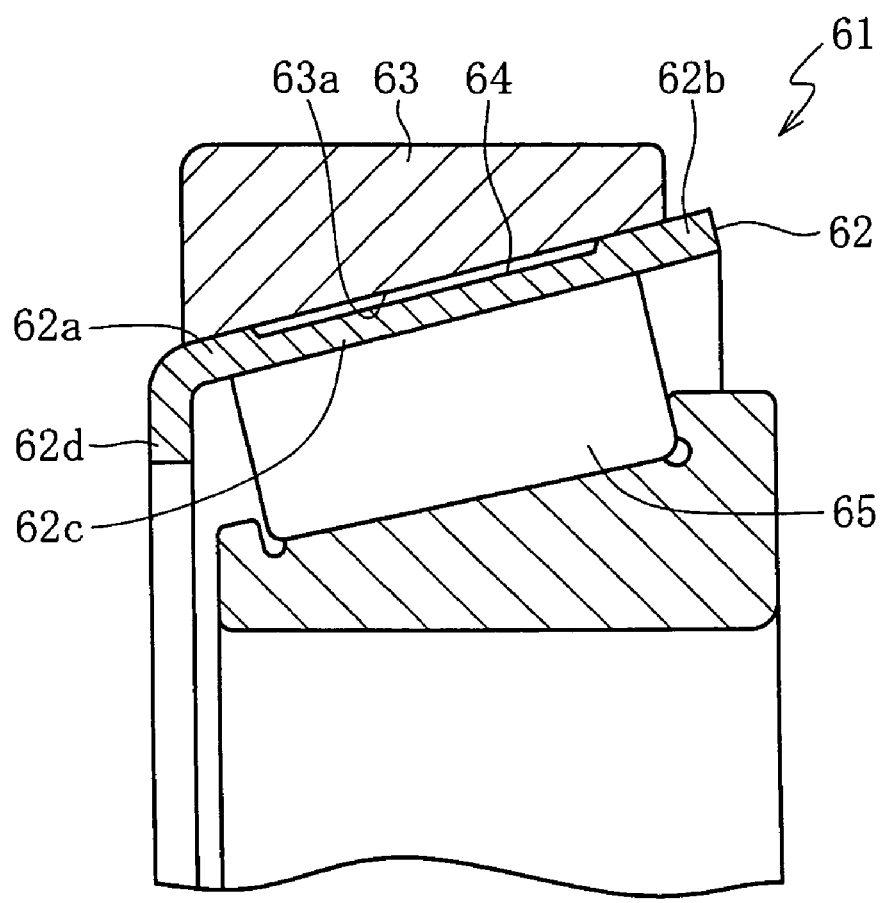
FIG. 9 is a longitudinal sectional view of a conventional tapered roller bearing.
Figure 10:
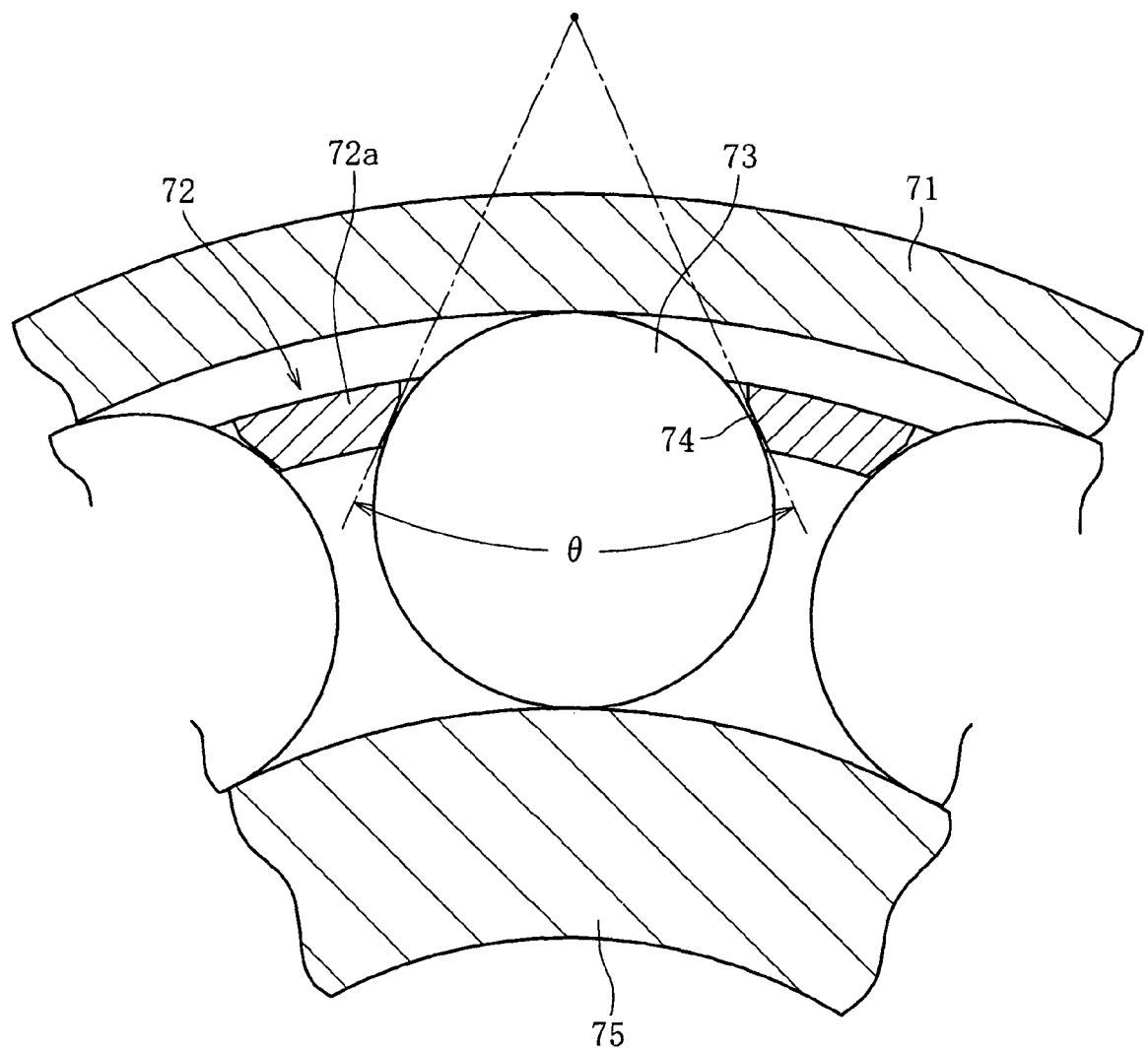
FIG. 10 is a cross sectional view of another conventional tapered roller bearing.

FIGS. 4 through 8 show pockets seen from the inner diameter side of the cage, with a roller abutment shown in two-dot chain line on the pole surface of a pocket (the lateral surface of a pole). In each case, the roller abutting width of the pocket pole surface is secured across 10% or more of the pocket length from the axial central position of the pocket, i.e., the central position of the pocket. The reason for this is to preclude a case in which a load acting from the roller to the cage is locally concentrated or is eccentrically applied to cause the occurrence of abnormal wear or the occurrence of damage due to stress concentration. Specifically, in the case of FIG. 4, the roller abutting width is secured across 10% or more of the pocket length on both axial sides. Therefore, the roller abutting width at the central position of the pocket is 20% or more of the pocket length. In the case of FIG. 5, where the roller abutting width is deviated to the left in the figure, the roller abutting width is secured across 10% or more of the pocket length also on the right side from the central position of the pocket. In the case of FIG. 6, where the roller abutting width is deviated to the right in the figure in the reverse of FIG. 5, the roller abutting width is secured across 10% or more of the pocket length also on the left side from the central position of the pocket. FIG. 7 shows the case in which the roller abutment is deviated in the reverse direction between the pocket pole surfaces on the upper and lower sides. In each case, the roller abutting width is secured across at least 10% of the pocket length from the central position of the pocket.

Embodiments of the invention have been described so far. However, the invention has various modifications which are possible without being limited to the embodiments. For example, while super engineering plastics including PPS, PEEK, PA, PPA, PAI and soon have been mentioned by way of example, glass fibers or carbon fibers may be added to these resin materials or to other engineering plastics, as the need arises, for the purpose of increasing strength.

The tapered roller bearing of the invention, besides being incorporated into the transmission of an automobile, may be used for the differential of an automobile or used for other applications than in automobile gear devices.

What is claimed is:

1. A tapered roller bearing comprising an inner ring, an outer ring, a plurality of tapered rollers rollably disposed between the inner and outer rings, and a cage for holding said tapered rollers in predetermined circumferentially spaced relation, wherein the roller coefficient exceeds 0.94 and the roller abutting width of the pocket pole surface is secured across 10% or more of the pocket length on the right and left sides with respect to the axial central position of the pocket.

2. A tapered roller bearing as set forth in claim 1, wherein the cage is made of steel plate.

3. A tapered roller bearing as set forth in claim 1, wherein the cage is made of resin.

4. A tapered roller bearing as set forth in claim 1, wherein with the cage positioned at the axial center, there is a clearance between the outer diameter of the cage and the raceway surface of the outer ring.

5. A tapered roller bearing as set forth in claim 4, wherein the cage is made of steel plate.

6. A tapered roller bearing as set forth in claim 4, wherein the cage is made of resin.

* * * * *